United States Patent [19]

Book et al.

[11] Patent Number: 4,679,113
[45] Date of Patent: Jul. 7, 1987

[54] ELECTRICAL DISTRIBUTION APPARATUS HAVING DRAW-OUT SURGE ARRESTER

[75] Inventors: William J. Book; Julian C. Scott; James A. Grace, all of Jefferson City, Mo.

[73] Assignee: Westinghouse Electric Corp., Pittsburgh, Pa.

[21] Appl. No.: 799,040

[22] Filed: Nov. 18, 1985

[51] Int. Cl.⁴ .............................................. H02H 7/04
[52] U.S. Cl. ....................................... 361/40; 337/20; 361/127
[58] Field of Search ..................... 361/35, 38, 385, 40, 361/127; 337/20

[56] References Cited

U.S. PATENT DOCUMENTS 2,271,890  2/1942  Rebhan ................................. 361/40
3,040,212  6/1962  Hermann et al. ..................... 361/40

FOREIGN PATENT DOCUMENTS 0137648  10/1979  Japan ..................... 361/38

Primary Examiner—A. D. Pellinen
Assistant Examiner—Morris Ginsburg
Attorney, Agent, or Firm—B. R. Studebaker

[57] ABSTRACT

Electrical distribution apparatus, such as a pad-mounted electrical distribution transformer, which has an electrically grounded tank or casing. A surge arrester assembly includes a housing, and a draw-out surge arrester having first and second insulatively spaced electrical contacts, with the draw-out surge arrester being removably disposed in the arrester housing. The arrester housing has first and second insulatively spaced metallic end members, with the first metallic end member functioning as a mounting structure for mounting the arrester housing in a tank opening, and as an electrical contact which automatically connects the first electrical contact of the draw-out surge arrester to the grounded tank of the apparatus to be protected. The second metallic end member of the housing electrically connects the second electrical contact of the draw-out surge arrester to an electrical circuit point within the tank to be protected against voltage surges.

8 Claims, 7 Drawing Figures

ELECTRICAL DISTRIBUTION APPARATUS HAVING DRAW-OUT SURGE ARRESTER

BACKGROUND OF THE INVENTION

1. Field of the Invention:

The invention relates in general to electrical distribution apparatus, and more specifically to electrical distribution apparatus having overvoltage or surge arresters.

2. Description of the Prior Art:

Electrical distribution apparatus, such as distribution transformers, must be protected from over-voltages or voltage surges, such as due to lightning. Pole mounted distribution transformers are inaccessible by the public, and thus surge arresters are quite naturally mounted on the outside of the transformer tank.

Pad-mounted distribution transformers used with underground distribution systems have a protective cover over the terminal or bushing compartment. Thus, with live-front designs, a surge arrester may be mounted external to the terminal wall, but within the protective cover. With dead-front designs, a surge arrester has been mounted in a plug-in elbow, with one arrester elbow for each primary bushing elbow. With loop feed, the high voltage connection is from a primary bushing well to an arrester bushing well, with the connection being made inside the tank. With radial feed, special dual type feed-through inserts for plug-in elbows are provided in which the high voltage connection from the bushing elbow to the associated arrester elbow is outside the tank.

Plug-in elbows and bushing wells are costly, so surge arresters have also been mounted inside the transformer tank, directly in the liquid dielectric, e.g., mineral oil. The oil-immersed type has the advantage of being protected from the environment external to the transformer tank, which environment has been a major cause of arrester failure over the years. The oil-immersed type, however, suffers many disadvantages. For example, the arrester may contaminate the liquid dielectric in the event the arrester is destroyed while accommodating a voltage surge. Also, the in-oil type is inaccessible, and thus not easily inspected or replaced. Some tanks are sealed, with no hand-hole cover, and even with a hand-hole cover, reaching blindly into the liquid dielectric to locate, remove and replace an arrester is time consuming and messy. Certain transformer surge and dielectric tests must be made without the surge arrester in the circuit. With the in-oil type of arrester, these tests are very costly since the arrester must be disconnected for the test and reconnected afterwards. Finally, a surge arrester is not required for every pad-mounted distribution transformer. For example, an arrester may be used at the initial line drop from the overhead to the underground, and at the end of the line. The end of the line, however, changes with system expansion. With the in-oil type it is a practical necessity to purchase all transformers with arresters.

SUMMARY OF THE INVENTION

Briefly, the present invention relates to new and improved electrical distribution apparatus of the type having a grounded metallic tank, and which requires, or may require, surge arrester protection. According to the teachings of the invention, an arrester assembly for such apparatus includes a housing and a draw-out surge arrester. The housing is a simple, low-cost structure having first and second insulatively spaced metallic members. The first metallic member is multi-function, mechanically mounting the arrester housing in a tank wall opening, while defining a first electrical contact which is automatically electrically connected to the grounded metallic tank. The second metallic member functions as a second electrical contact, and as a terminal for an internal tank electrical lead which is connected to a circuit point to be protected. The low cost arrester housing is supplied with each unit of the distribution apparatus, either with the associated draw-out surge arrester, or with a protective dust cap, as desired. Thus, for nominal additional cost, every unit of the distribution apparatus has provisions for overvoltage surge protection, which can become functional by simply removing the protective cap and inserting a draw-out surge arrester into the arrester housing. If the draw-out surge arrester is assembled with its housing and dielectric tests are required, the draw-out surge arrester is simply removed until the tests have been completed. The arrester itself may be easily inspected, and replaced if necessary. A unit which initially required surge protection, and through distribution line expansion or change no longer requires such protection, may simple have the draw-out surge arrester removed and placed into another unit which may now require such protection.

In a preferred embodiment of the invention, the "well" created by the housing is "dry", i.e., it is hermetically sealed from the internal tank environment. The eternal open end of the housing, however, is not sealed when the draw-out surge arrester is assembled therewith. Thus, the small $I^2R$ loss of a gapless type surge arrester will not produce damaging heat build-up, as the heat will escape from the dry well to the cooler terminal compartment of the apparatus by natural thermal flow.

While the dry well may extend into a gas space of the associated distribution appartus, it is preferred that the dry well extend into any liquid dielectric which may be contained in the grounded tank. This will minimize the clearance distance between the arrester and the gounded tank.

It is important to recognize that the required arrester housing length is significantly shorter than would be required for a draw-out fuse for the same voltage. Both fuse terminals on the fuse sheath must be spaced from the grounded tank wall by predetermined distances, requiring substantial penetration of the fuse assembly into the tank. Thus, a draw-out fuse may require rearrangement of the internal components, and possibly an increase in tank dimensions, while the draw-out arrester of the present invention may be easily accommodated without resorting to such costly expedients. In the present invention, the housing length is shorter by at least the dimension between the two contacts of a fuse housing, for the same withstand voltage.

While it is preferred that the well created by the housing is dry, i.e., hermetically sealed from the internal tank environlment, another embodiment of the invention extends the well into liquid dielectric and provides openings in the housing wall to provide flow of the liquid dielectric coolant past the draw-out arrester. The openings are provided with a suitable mesh or non-conductive screen to prevent contamination of the associated distribution apparatus in the event the arrester is destroyed while accommodating a voltage surge. This embodiment has an advantage of providing liquid cooling for the arrester, but it does require that the draw-out surge arrester seal the external housing opening when it is assembled with the arrester housing.

The draw-out surge arrester portion of the arrester assembly includes an insulative tubular member which contains the arrester blocks or non-linear resistors, with metallic end caps for the tube functioning as first and second electrical contacts for the non-linear resistors. First and second garter spring contacts are held against the first and second end caps, respectively, to provide first and second electrical contacts which respectively engage the insulatively spaced first and second stationary electrical contacts of the arrester housing. By pressing the garter spring contacts directly against the metallic end caps, the length of the draw-out assembly may be controlled by the minimum electrical clearance required between the contacts of the arrester housing, and not by the mechanical limitations of the draw-out portion of the arrester assembly, assuring minimum penetration of the arrester housing into the tank of the distribution apparatus.

BRIEF DESCRIPTION OF THE DRAWINGS

The invention may be better understood, and further advantages and uses thereof more readily apparent, when considered in view of the following detail description of exemplary embodiments, taken with the accompanying drawings in which.

DESCRIPTION OF PREFERRED EMBODIMENTS

The invention relates in general to any type of power frequency electrical distribution apparatus, single phase or multiple phase, having a grounded metallic casing or tank, which may require overvoltage surge protection. For example, such apparatus may be a distribution transformer, or an electrical switch used in a distribtuion system. For purposes of example, the invention will be described relative to a pad-mounted, single-phase electrical distribution transformer, such as used by electrical utilities to provide 60 Hz, 120/240 volts for residential use.

Figure 1:
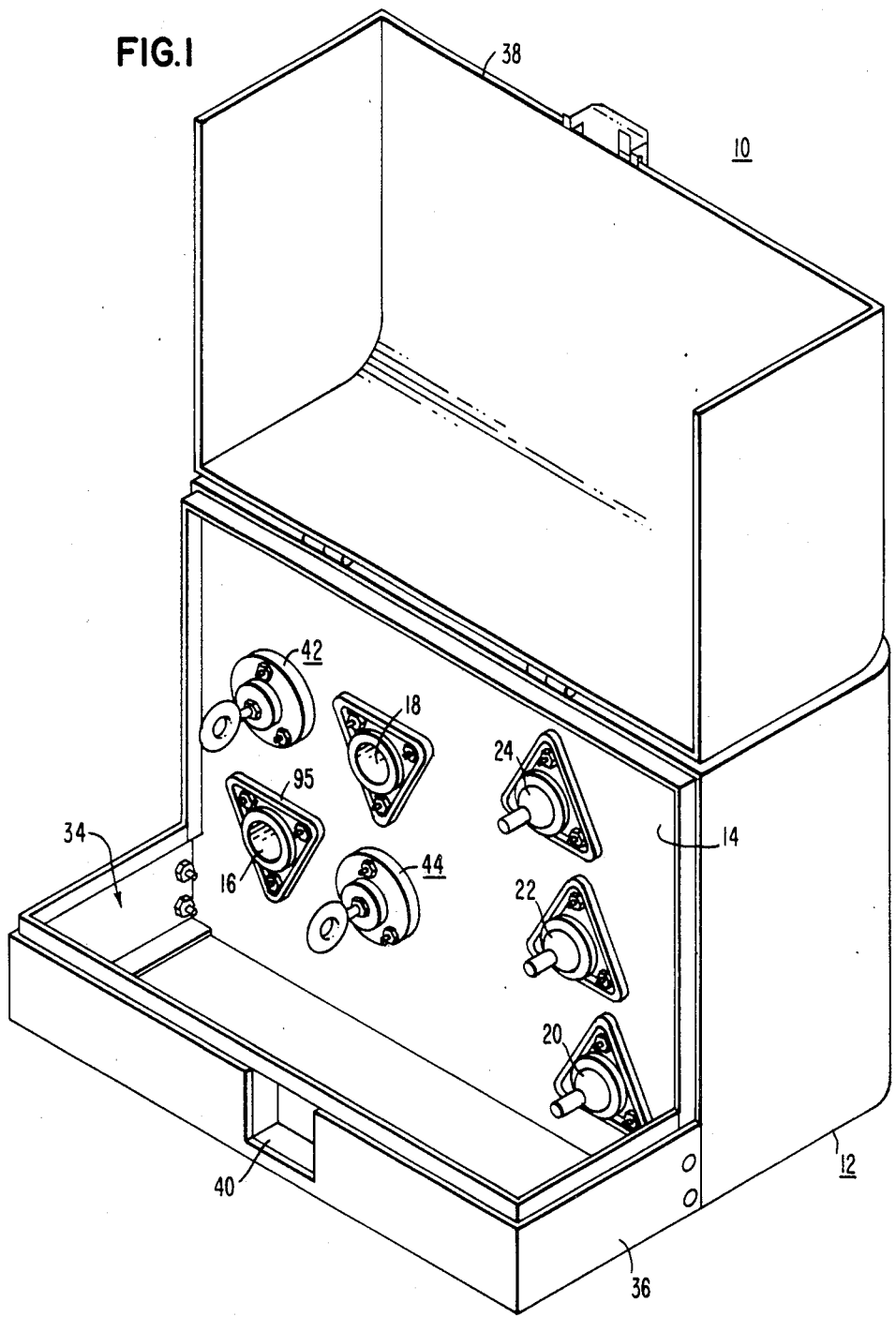
FIG. 1 is a perspective view of a pad-mounted electrical distribution transformer constructed according to the teachings of the invention.
Figure 2:
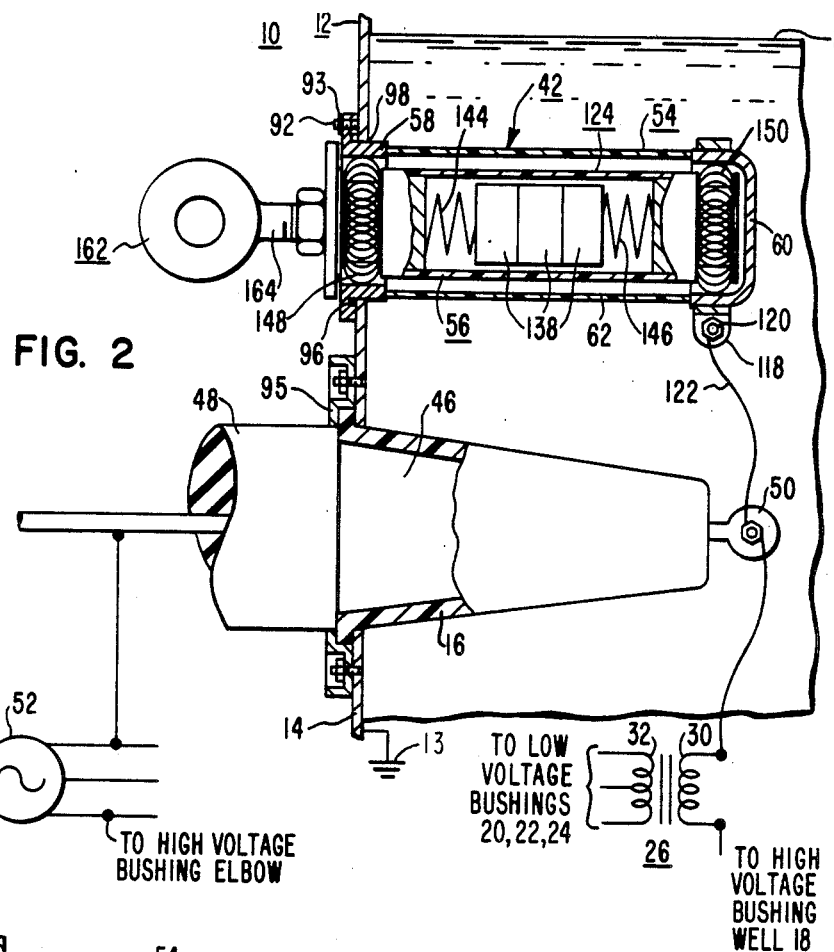
FIG. 2 is a fragmentary view, partially in section of the distribution transformer shown in FIG. 1, illustrating a dry-well embodiment of the invention.

Referring now to the drawings, and to FIGS. 1 and 2 in particular, there is shown a pad-mounted, single-phase elctrical distribution transformer 10 constructed according to the teachings of the invention. FIG. 1 is a perspective view of transformer 10, and FIG. 2 is a fragmentary, sectional view of transformer 10. Transformer 10 includes an enclosed metallic tank 12 having a front wall or surface 14 on which the electrical terminals are mounted, such as high voltage bushing wells 16 and 18, and low voltage bushings 20, 22 and 24. Two high voltage bushing wells 16 and 18 are provided for loop feed, while only one high voltage well would be provided for radial feed. Tank 12 is electrically grounded, as indicated at 13 in FIG. 2. A core-coil assembly 26 is disposed within tank 12, immersed in a suitable liquid dielectric 28, such as mineral oil. The invention is also suitable for any other type of environment, such as the silicones, $C_2Cl_4$, high molecular weight mineral oil, or even gases, such as air, nitrogen, $SF_6$, and the like. The core-coil assembly 26 includes a primary winding 30 which is connected to the high voltage bushing wells 16 and 18, and a secondary winding 32 which is connected to the low voltage bushings 20, 22 and 24.

A cabinet or compartment 34 is formed adjacent to the front wall 14 of tank 12, for enclosing the bushings, the cables which rise from the ground and connect to the bushings, as well as any other items commonly disposed on the front wall of the tank 12. Cabinet 34 includes a U-shaped sill 36 which is attached to the tank 12, and a terminal cover or hood 38 which is pivotally attached to the tank 12. Cover 38 has the open position illustrated, which enables authorized personnel to gain access to the cable compartment 34, and a closed position. In the closed position, cover 38 is locked to the sill 36 via a padlock (not shown) in a sill recess 40.

According to the teachings of the invention, a surge arrester assembly is provided for each high voltage bushing well, such as surge arrester assemblies 42 and 44 shown in FIG. 1. For radial feed applications, only one surge arrester assembly would be required. For three-phase apparatus, three surge arrester assemblies would be provided.

FIG. 2 is a fragmentary, sectional view of arrester assembly 42 which is associated with high voltage bushing well 16. An insert 46, and an insulated plug-in elbow 48 are shown in FIG. 2, which completes an electrical circuit from a terminal 50 at the innermost end of high voltage bushing well 16 to a source 52 of electrical potential. Terminal 50 is connected to one side of the high voltage primary winding 30 of the core-coil assembly 26.

Figure 6:
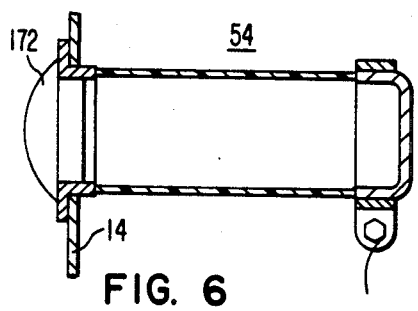
FIG. 6 is a cross-sectional view of an arrester housing with a protective cap, for an application of the distribution apparatus which, at least at the moment, does not require surge voltage protection.
Figure 5:
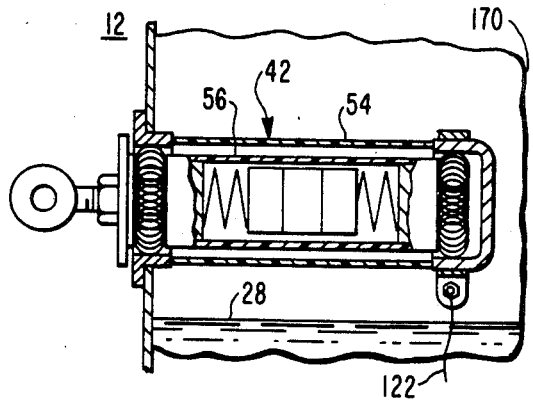
FIG. 5 is a cross-sectional view similar to that of FIG. 2, except illustrating the arrester mounted in the gas space of the associated distribution apparatus, instead of in liquid dielectric.
Figure 7:
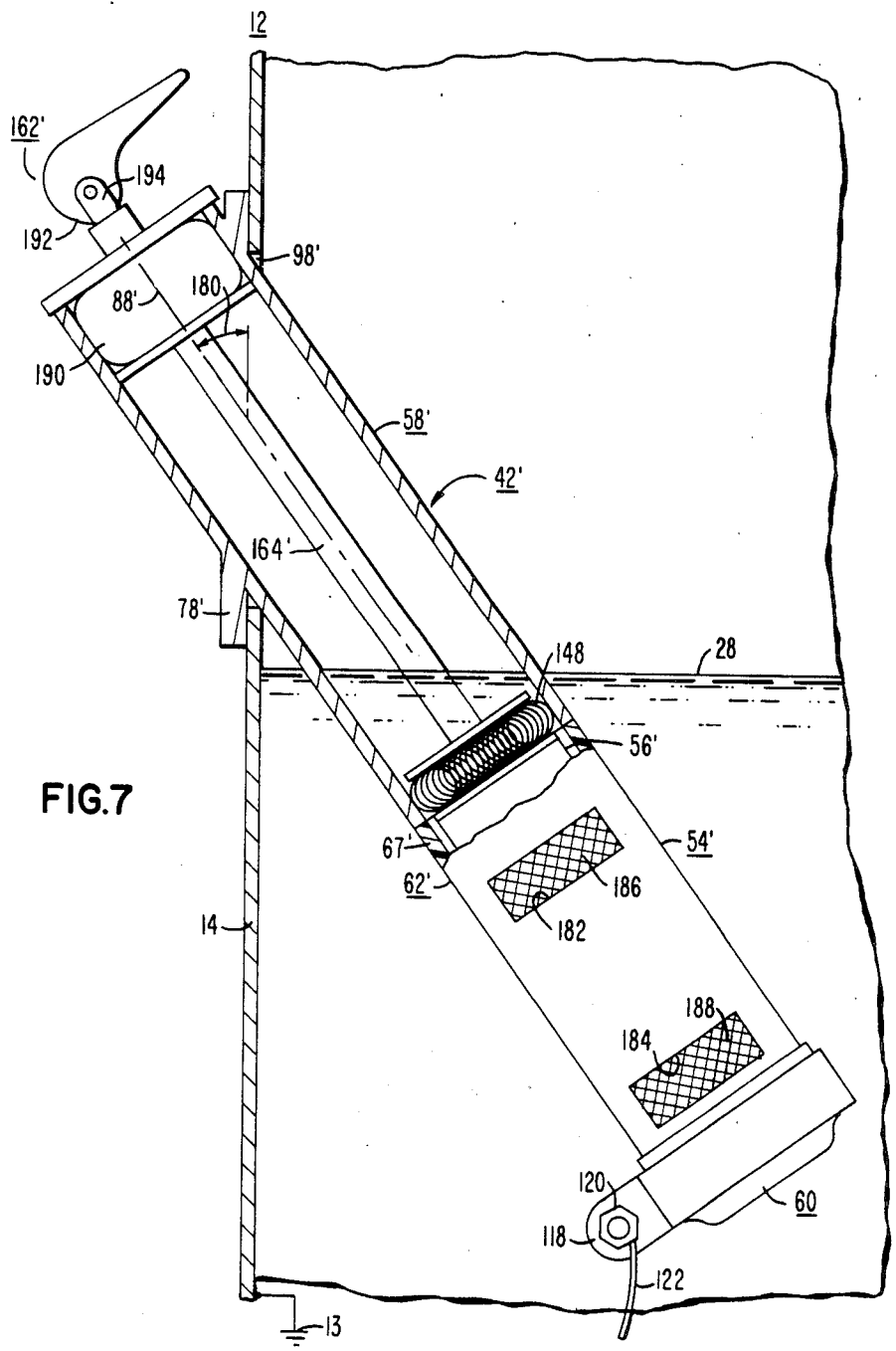
FIG. 7 is a fragmentary view, partially in section, of a wet-well embodiment of the invention.

Surge arrester assembly 42 includes a housing portion 54 and a draw-out arrester portion 56. In a preferred embodiment of the invention, housing 54 forms a dry well, i.e., it is hermetically sealed from the internal transformer environment, and this dry well embodiment is shown in FIGS. 2, 3, 5 and 6. A wet-well embodiment, to be hereinafter described, is shown in FIG. 7. Housing portion 54, as shown in cross-section in FIG. 3, includes first and second insulatively spaced metallic end portions 58 and 60, respectively. The electrical insulation for mounting and spacing the metallic end portions 58 and 60 is provided by a tubular member 62 selected for its electrical insulating characteristics, mechanical strength, and its ability to withstand the chemical environment and temperatures to which it will be subjected inside the transformer tank 12. A filament wound glass-filled epoxy has been found to be excellent for all of the hereinbefore mentioned transformer insulating and cooling dielectrics, gas or liquid. Tubular member 62 has first and second axial ends 64 and 66, respectively, and the wall portion 67 of the tubular member has an inner cylindrical surface 69 which defines an opening 68 having a longitudinal axis 71 which extends between its ends. Since this is a dry-well embodiment, wall portion 67 is solid, i.e., devoid of openings.

The first metallic end portion or member 58 of arrester housing 54 provides many different functions. It is formed of a good electrical conductor, such as copper, aluminum, steel or brass, and is essentially a tubular member having first and second axial ends 70 and 72, respectively, with a wall portion 73 having a smooth inner cylindrical surface 74 which defines an opening 76 which extends between its ends. Wall portion 73 is externally circumferentially flanged, having a flange 78 disposed intermediate ends 70 and 72. Flange 78 extends perpendicularly outward from outer cylindrical surfaces 80 and 82, to provide first and second flat surfaces 84 and 86 which are perpendicular to the longitudinal central axis 88 of member 58. Flange 78 may have a plurality of openings, such as opening 90, which extend between surfaces 84 and 86, for receiving metallic stud members, such as stud 92 shown in FIG. 2, which stud members are welded to tank wall 14. Alternatively, the tank mounted stud members 92 may proceed through openings in a separate ring-type flange member which overlaps flange 78 and clamps tightly to surface 84 of flange 78. For example, a ring-type flange member may be used similar to flange 95 shown holding bushing well 16 to tank 12. Flangs 78 also has a circumferential groove 94 disposed in flat surface 86 for receiving a sealing gasket 96 shown in FIG. 2. The second axial end 72 of the first metallic portion 58 may be suitable grooved for receiving the first axial end 64 of insulative tubular member 62. A suitable adhesive, such as an epoxy, may be used to attach ends 64 and 72, with openings 76 and 68 being coaxial.

The first metallic end portion 58 thus provides the mechanical function of securely fastening arrester housing 54 within an opening 80 in tank wall 14, while forming a hermetic seal between the flange 78 and the tank wall 14 via the gasket 96. The metallic end portion 58 also provides electrical functions, as its inner cylindrical surface 74 defines a first electrical contact for cooperation with an electrical contact on the draw-out arrester portion 56. The metallic end portion 58 also electrically connects the first electrical contact defined by surface 74 to the grounded metallic tank 12 when nuts are assembled with the tank studs, such as nut 93 shown in FIG. 2.

The second metallic end portion 60 functions as an electrical contact for a second contact on the draw-out arrester portion 56. It also provides support for a terminal adapted for connection to the portion of an electrical circuit within the tank 12 to be protected against overvoltage surges. Finally, in this dry well embodiment, it hermetically seals the open end 66 of the insulative tubular member 62.

Figure 3:
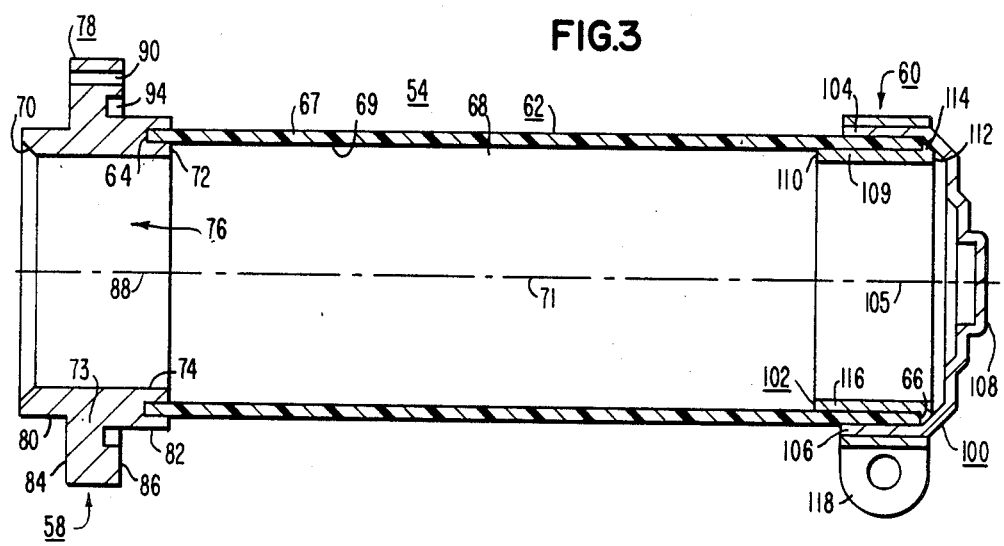
FIG. 3 is a cross-sectional view of an arrester housing constructed according to an embodiment of the invention.

More specifically, as illustrated in FIG. 3, the second metallic end portion 60 may be constructed of first and second metallic members 100 and 102, each having a good electrical conductivity, such as copper, aluminum, steel or brass. Member 100 is cup-shaped, having a cylindrical wall portion 104 symmetrical about a longitudinal axis 105, with the cup-shape defining an open end 106 and a closed end 108. Member 102 is tubular, having a wall portion 109, also symmetrical about axis 105. Member 102 has first and second axial ends 110 and 112, respectively, with end 112 having a small right angle flange 114 which extends perpendicularly outward from wall portion 109. Member 102 is coaxially disposed within the open end 110 of member 100, with flange 114 contacting member 100 at the transition point between wall portion 104 and end portion 108. Flange 114 is suitably attached to member 100, such as by brazing. Flange 114 is sized, as is the outside diameter of wall 109 of member 102, to provide a snug recess or space between walls 109 and 104 for receiving end 66 of insulative tubular member 62. End 66 may be secured in this recess by a suitable adhesive. Wall 109 defines a cylindrical inner metallic surface 116 which functions as a second electrical contact of arrester housing 54.

A clamp 118, formed of tin-plated steel, for example, is slipped about the outer surface of wall portion 104, and firmly clamped in this position by a suitable nut and bolt combination 120 shown in FIG. 2. The nut and bolt combination 120 secures one end of an electrical lead 122 shown in FIG. 2, the other end of which is connected to the circuit point to be protected, such as to terminal 50 of bushing well 16 which thus protects primary winding 30 from voltage surges which may attempt to enter the associated end of the winding.

Figure 4:
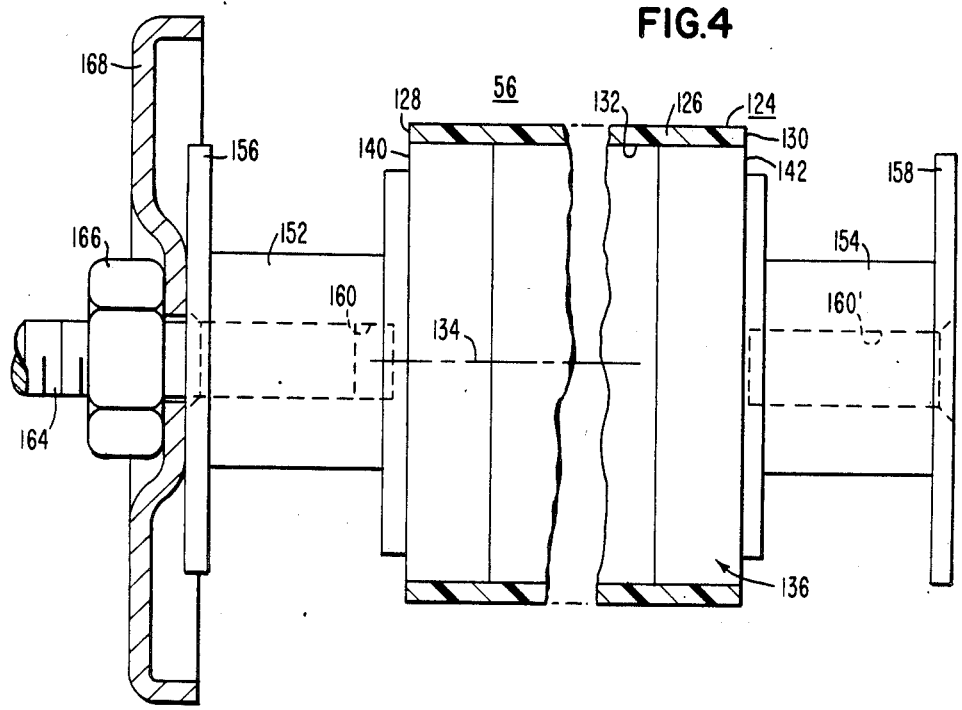
FIG. 4 is a fragmentary view, partially in section, of a draw-out portion of the arrester assembly, constructed according to an embodiment of the invention.

The draw-out surge arrester portion 56 of surge arrester assembly 42, best shown in FIGS. 2 and 4, includes an insulative tubular member 124 which may be similar in construction to tubular member 62. Tubular member 124 has a solid wall portion 126, i.e., it is devoid of openings through the wall portion, first and second axial ends 128 and 130, respectively, and an inner cylindrical surfce 132 which is symmetrical about a longitudinal axis 134. Inner surface 132 defines an opening 136 which extends between ends 128 and 130. The draw-out surge arrester 56 is preferably of the gapless type, having the requisite number of non-linear resistive elements or blocks 138, such as zinc-oxide, with the number of elements depending upon the normal voltage level of the circuit point to be protected. For example, if each arrester element is rated 3 KV, and the circuit point to be protected normally operates between 6 KV and 9 KV, three elements would be porvided. The non-linear resistive elements are stacked in series and the ends of the stack are electrically connected to electrically conductive first and second end cap members 140 and 142. respectively, which members seal the open ends 128 and 130, respectively, of the tubular member 124. End cap members 140 and 142 are constructed of a good electrical conductor, such as copper or brass. The ends of the stack of non-linear resistor elements 138 are connected to the end cap members 140 and 142, such as via one or more compression springs, such as compression springs 144 and 146.

While the preferred embodiment of the invention utilizes a gapless surge arrester, the teachings of the invention may also apply to the use of a gap-type surge arrester, such as a gap-type arrester having non-linear resistive elements constructed of zinc-oxide, or silicon carbide. The gapped type arrester has an advantage in that there are no $I^2R$ losses until the arrester operates, and thus there is no heat to remove during normal monitoring. This advantage over the gapless arrester is offset, however, by the fact that the gapped arrester is longer and more costly than the gapless type, and the gap must be protected from contamination, necessitating a dry well design.

In a preferred embodiment of the invention, first and second garter spring contacts 148 and 150, shown in FIG. 2, are in direct contact with the first and second metallic end caps 140 and 142, respectively, which minimizes the overall length of the surge arrester. By minimizing the length, the draw-out surge arrester 56 may be designed according to the minimum length required between the spaced contacts of the arrester housing 54, as required for electrical clearance. If the draw-out arrester 56 exceeds this minimum electrical clearance dimension, then the contacts of the housing 54 will have to be spaced in excess of the minimum electrical clearance, increasing the penetration of the housing into tank 12. This preferred construction, along with the arrester housing construction in which the mounting assembly functions as an electrical contact which directly connects one end of the draw-out arrester 56 to the grounded metallic tank 12, enables a very short housing 54 to be utilized. For example, a draw-out fuse for a 7200 volt application would extend into tank 12 about 20 inches, while arrester housing 54 would extend into tank 12 by only about 8.5 inches for the same 7200 volt application. The function of placing the garter springs 148 and 150 directly against metallic end cap members 140 and 142 may be accomplished as shown in FIG. 4, by constructing end cap members 140 and 142 in the form of a metallic spool in which the end caps 140 and 142 form one flange of the spool. Thus, garter springs 148 and 150 may encircle axially extending cylindrically shaped portions 152 and 154, respectively, which are integral with the end caps 140 and 142, or suitably attached thereto. The extreme outer ends of projections 152 and 154 terminate in flanges 156 and 158, respectively. Flanges 156 and 158 may be integral with projections 152 and 154, respectively, or suitably attached thereto, as desired.

Flange 156 and cylindrical projection 152 define a tapped opening 160 coaxial with the longitudinal axis or centerline 134. To simplify part manufacture, flange 158 and cylindrical projection 154 may also have a tapped opening 160'. Tapped opening 160 receives a handle or hook eye 162. Handle 162 has a threaded shaft 164 which receives a jamb nut 166 and a dust cover 168 before the shaft is threadably engaged with tapped opening 160. It is important to note that the dust cover 168 does not seal the open external end of housing 54 when the draw-out surge arrester 56 is inserted into housing 54. A space is intentionally provided at the external end of the arrester housing 54 so heat produced by the small I²R loss in the non-linear resistive elements 138 may flow through the relatively open garter spring contact 148 and out of the dry well defined by the arrester housing 54. It will also be noted that when the draw-out surge arrester 56 is inserted into housing 54 that the garter springs 148 and 150 are compressed to make good electrical contact with the inner cylindrical surfaces 74 and 116 which define the electrical contacts of the arrester housing 54. This automatically connects garter spring 148 to the grounded tank 12, and it also automatically grounds handle 162.

FIG. 2 illustrates the preferred embodiment of the invention in which the housing 54 is immersed in the liquid dielectric 28. This is a preferred embodiment because it enables the spacing between the arrester housing and the grounded tank to be reduced, compared with the spacing which would be required in air, for any given withstand voltage. The teachings of the invention may also be practiced by inserting housing 54 into gas, such as into the gas space 170 located above the liquid dielectric 28, with this embodiment of the invention being illustrated in FIG. 5. the gas in the gas space 170 may be air, it may be an inert gas, such as nitrogen, or it may be a gas having a superior electrical breakdown strength, such as $SF_6$.

It will be noted that the relatively more costly portion of the arrester assembly 42 is the draw-out portion 56 which contains the non-linear resistive elements 138. Since the housing portion 54 has a relatively simple structure and low manufacturing cost, it is economically attractive to manufacture all units of the distribution apparatus which may require surge protection at some point in the future with an arrester housing 54 for each circuit point which may require protection. This embodiment of the invention is shown in FIG. 6, with a suitable protective cap or cover 172 being used to cover the open end of arrester housing 54 until such time that surge protection is required. Units which are shipped with the draw-out surge arrester, it subsequently used where surge protection is not required, may have the draw-out portion 56 removed and used with another unit, with a cap or cover 172 being used to cover the opening in the arrester housing 54.

While the dry-well concept described to this point is the preferred embodiment, because it is the simplest and lowest cost while providing the minimum penetration of the arrester housing into the tank, the teachings of the invention are also applicable to a wet-well design. In a wet-well design both the arrester housing and the surge arrester portion of the draw-out assembly are immersed in the liquid dielectric 28. This embodiment of the invention is shown in FIG. 7 relative to a surge arrester assembly 42'. Components which do not need to be modified in the FIG. 7 embodiment are given the same reference numerals as in the dry-well embodiment, and will not be described again. Similar but modified components are given the same reference numerals as their counterparts in the dry-well embodiment, with the addition of a prime mark.

More specifically, an opening 98' is required in wall 14 of tank 12 which is located slightly above the level of the liquid dielectric 28, to prevent the liquid dielectric 28 from flowing out of the tank 12 when the draw-out arreter portion 56' is removed from the arrester housing 54'. The arrester housing portion 54' is modified by changing the angle of the mounting flange 78', which is associated with the first metallic end portion 58', relative to the longitudinal axis 88' of end portion 58'. This angle is selected to minimize the length of the arrester housing. A suitable angle, for example, indicated at 180, is about 35°. The first metallic end portion 58' of housing 54' is longer than its counterpart in the dry well embodiment, in order to electrically connect garter spring 148 to the electrically grounded tank 12. A plurality of openings are provided in wall 67' of insulative tubular member 62', such as openings 182 and 184, to enable the liquid dielectric 28 to flow into arrester housing 54' and surround the active portion of the draw-out surge arrester 56'. As illustrated in FIG. 7, openings 182 and 184 may be covered with mesh 186 and 188, respectively, which has openings for enabling flow of the liquid dielectric 28 while preventing particles of the draw-out surge arrester 56' from leaving the wet well, should the arrester fail while accommodating an overvoltage surge.

The draw-out portion 56' of arrester assembly 42' is modified by providing a shaft 164' which is longer than the shaft 164 of the dry well embodiment, and by providing a handle 162' which seals the open end of housing 54' after the draw-out surge arrester portion 56' has been inserted into the arrester housing 54'. As illustrated in FIG. 7, an elastomeric, resilient stopper 190 may be expanded after insertion into the open end of housing 54', by an externally actuatable cam 192 which actuates a rod 194 connected to the stopper 190, similar to a thermos bottle top.

In summary, there has been disclosed new and improved electrical distribution apparatus, such as a pad-mounted distribution transformer, which has surge voltage protection without resorting to costly insulated plug-in elbows, and without requiring surge arresters to be inaccessibly mounted within the tank of the apparatus to be protected. The surge arrester of the present invention requires little penetration depth into the apparatus tank, due to the unique multifunction construction of the arrester housing and draw-out assembly, and it has the advantages of enabling the active elements of the arrester to be easily removed, inspected, and replaced if necessary. The draw-out arrester may be easily removed for dielectric tests on the associated distribution apparatus, and just as easily replaced after the tests have been completed. The distribution apparatus may be sold with only the housing portion of the arrester assembly, if desired, with surge protection being provided, as required in the future, by inserting a draw-out surge arrester portion into the arrester housing.

We claim as our invention:

1. Electrical distribution apparatus, comprising:
   an electrically grounded metallic tank having an opening,
   an electrical element in said tank,
   and an arrester assembly including a housing which extends into said tank via said tank opening, and a draw-out surge arrester in said housing having first and second insulatively spaced electrical contacts,
   said housing including first and second insulatively spaced metallic means,
   said first metallic means of said housing mechanically mounting said housing to said tank and electrically connecting the first electrical contact of said draw-out surge arrester to said grounded metallic tank,
   said second metallic means of said housing electrically connecting the second electrical contact of said draw-out surge arrester to said electrical element.

2. The electrical distribution apparatus of claim 1 including a liquid dielectric disposed in the tank, and wherein the housing of the arrester assembly defines a sealed well which extends into said liquid dielectric.

3. The electrical distribution apparatus of claim 1 including a liquid dielectric disposed in said tank to a predetermined level which defines a gas space within said tank, with the electrical element being immersed in said liquid dielectric, and wherein the housing of the arrester assembly defines a sealed well which extends into said gas space.

4. The electrical distribution apparatus of claim 3 wherein the electrical element includes a core-coil distribution transformer assembly having primary and secondary windings, and including primary and secondary bushings on said tank respectively connected to said primary and secondary windings, with the second metallic means of said arrester housing being electrically connected to said primary winding.

5. the electrical distribution apparatus of claim 1 including a liquid dielectric disposed in the tank which surrounds at least a portion of the housing of the arrester assembly, and wherein the housing defines openings which provide fluid flow communication between said liquid dielectric and the draw-out surge arrester disposed within the arrester housing.

6. The electrical distribution apparatus of claim 1 wherein the draw-out surge arrester includes an insulative tubular member having first and second ends, first and second metallic end cap members disposed to respectively seal said first and second ends of the insulative tubular member, and non-linear resistor means within said insulative tubular member which interconnect said first and second metallic end cap members, wherein the first and second electrical contacts of the draw-out surge arrester each include a metallic garter spring, and including means for holding each of said metallic garter springs in electrical contact with an associated metallic end cap member.

7. An electrical distribution transformer, comprising:
   an electrically grounded metallic tank having a wall portion which defines openings,
   a liquid dielectric disposed in said tank,
   primary and secondary bushings mounted on the wall portion of said tank each having an electrical conductor element which extends through a tank opening,
   a core-coil assembly immersed in said liquid dielectric and having primary and secondary windings connected to said primary and secondary bushings, respectively,
   a surge arrester housing defining an elongated opening having at least one open end adapted to removably receive a draw-out surge arrester,
   said arrester housing being disposed through an opening in the wall portion of said tank, and including metallic tank wall mounting means on said arrester housing which is electrically connnected to said grounded metallic tank and which defines a first electrical contact, said arrester housing further including a second electrical contact, and insulative means which separates said first and second electrical contacts,
   and means electrically connecting the second electrical contact of said arrester housing to a primary bushing.

8. The electrical distribution transformer of claim 7 including a draw-out surge arrester having first and second insulatively spaced electrical contacts which respectively engage the first and second electrical contacts of the arrester housing, and include non-linear resistor means disposed between said first and second spaced electrical contacts of the draw-out surge arrester.

* * * * *